United States Patent [19]

Mizrahi et al.

[11] Patent Number: 5,672,268

[45] Date of Patent: Sep. 30, 1997

[54] FLUID TREATMENT APPARATUS

[75] Inventors: Tamir Mizrahi; Robert Brons; Gennady Shagas, all of Eilat; Neil Marks, Pardesia, all of Israel

[73] Assignee: Red Sea Fish Pharm Ltd., Herzlia Pituach, Israel

[21] Appl. No.: 648,252

[22] Filed: May 15, 1996

Related U.S. Application Data

[63] Continuation-in-part of Ser. No. 415,795, Apr. 3, 1995, abandoned.

[51] Int. Cl.⁶ .................................................. A01K 63/04
[52] U.S. Cl. ........................ 210/110; 210/169; 210/119; 210/266; 210/416.2; 210/520
[58] Field of Search ................................ 210/110, 150, 210/151, 169, 266, 416.2, 520, 661, 807, 903, 119

[56] References Cited

U.S. PATENT DOCUMENTS

| | | |
|---|---|---|
| 1,784,132 | 12/1930 | Cabrera . |
| 3,512,640 | 5/1970 | Hellmann . |
| 3,956,128 | 5/1976 | Turner . |
| 4,411,780 | 10/1983 | Suzuki et al. . |
| 4,834,872 | 5/1989 | Overath . |
| 4,954,257 | 9/1990 | Vogelpohl et al. . |
| 5,160,622 | 11/1992 | Gunderson et al. . |
| 5,250,187 | 10/1993 | Franks . |
| 5,447,629 | 9/1995 | Chaumont et al. . |
| 5,453,183 | 9/1995 | Hoffa . |
| 5,527,455 | 6/1996 | Hoffa ........................ 210/169 |

*Primary Examiner*—Neil McCarthy
*Assistant Examiner*—Theodore M. Green
*Attorney, Agent, or Firm*—Sol Sheinbein

[57] ABSTRACT

Fluid treatment apparatus including a vessel having a fluid inlet port, a fluid outlet port and a deflector plate and containing a medium and an inlet having an inlet end in flow communication with the fluid inlet port and a discharge end providing an incoming flow of untreated fluid against the deflector plate for reversal thereby to an outgoing flow of fluid passing through the medium for treatment, the clearance between the discharge end and the deflector plate being selectively adjustable for controlling the flow of fluid through the vessel.

15 Claims, 5 Drawing Sheets

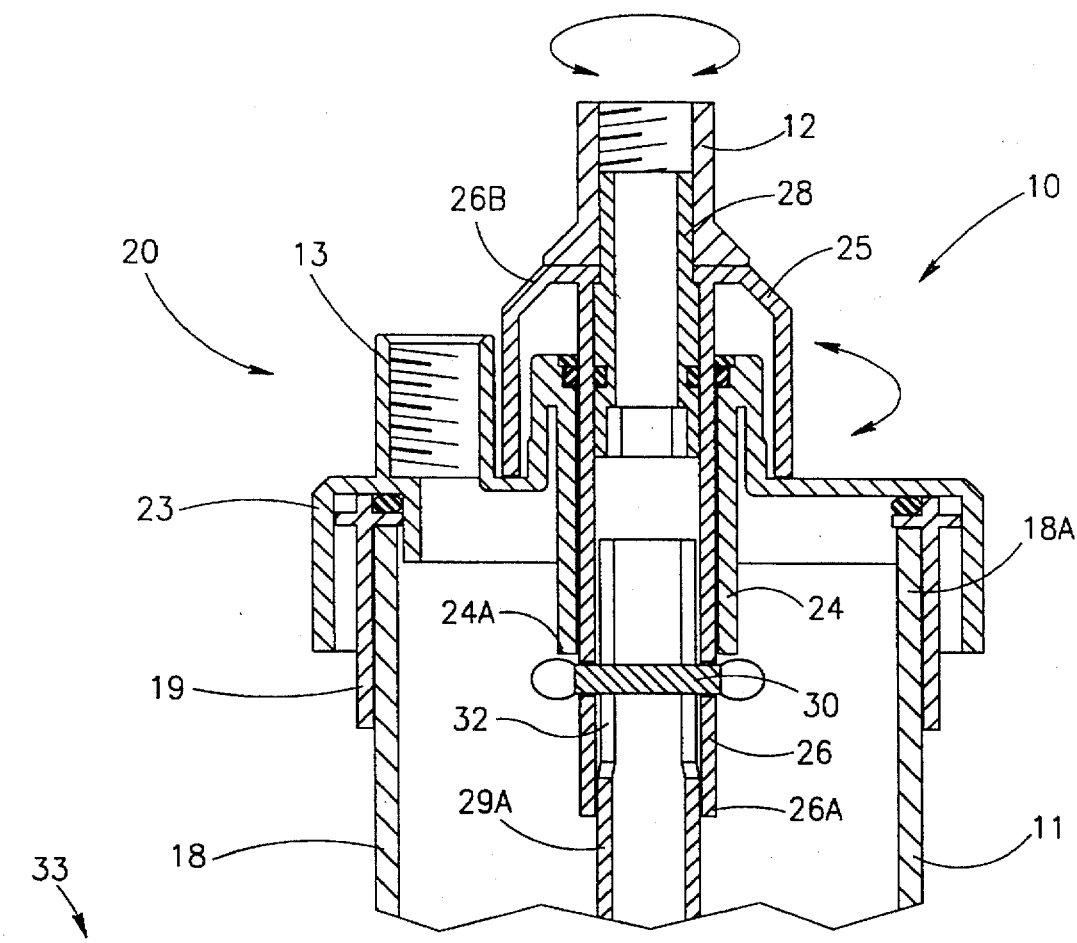
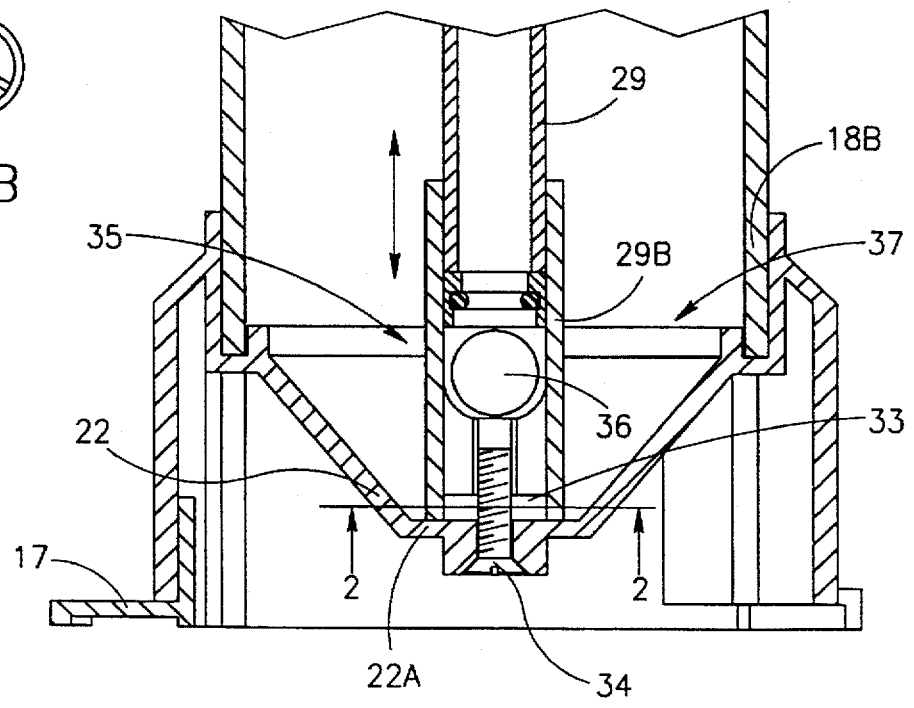
FIG.2B
FIG.2A

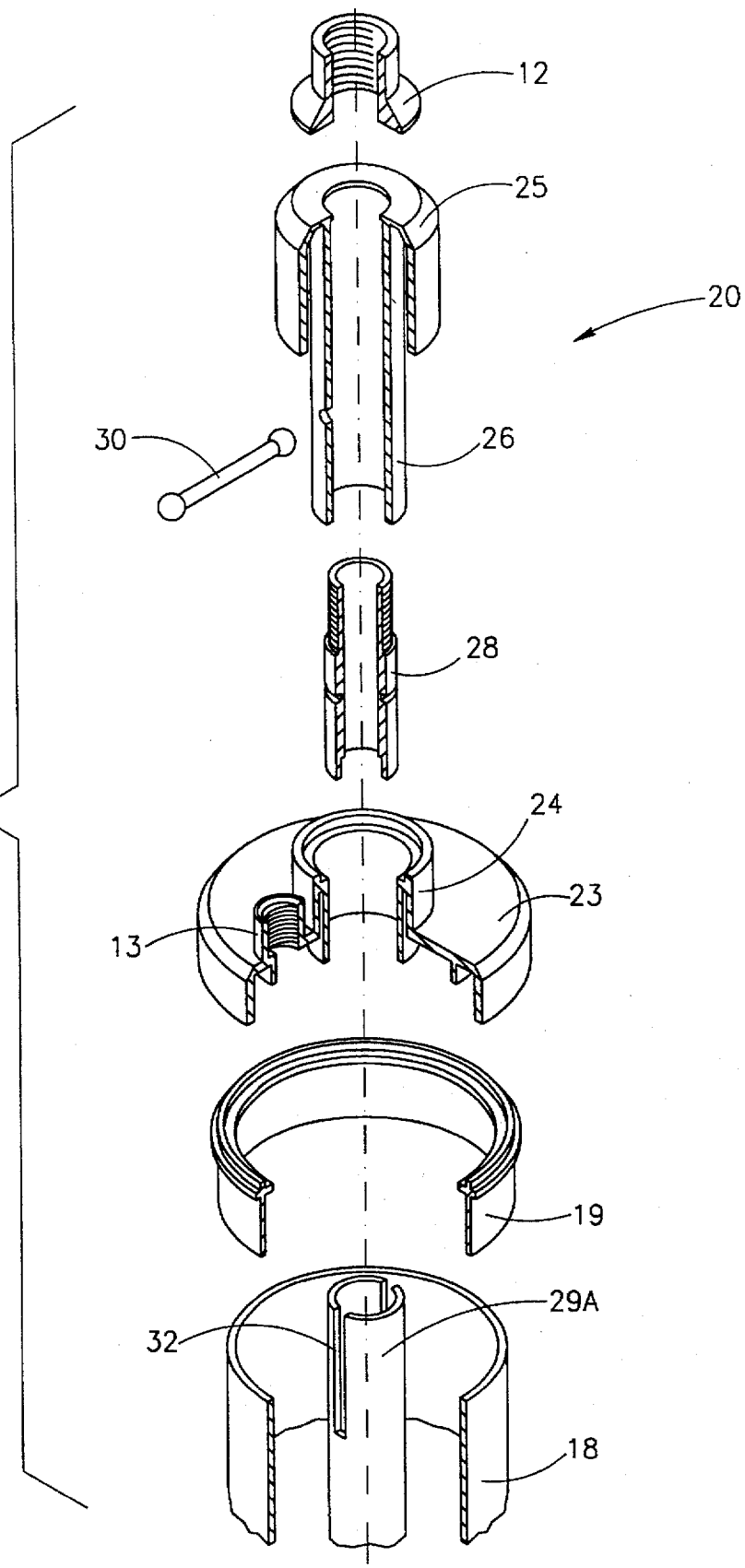

FLUID TREATMENT APPARATUS

CROSS REFERENCE TO RELATED APPLICATIONS

This is a Continuation-in-Part application to U.S. Ser. No. 08/415,795 filed Apr. 3, 1995, now abandoned.

FIELD OF THE INVENTION

The present invention relates to fluid treatment apparatus in general and in particular to aerobic biological filtration of water circulating in a fish holding tank.

BACKGROUND OF THE INVENTION

It is well known that water contained in home aquaria and commercial fish tanks is preferably treated by biological filtration so as to remove waste products, in general, and ammonia, in particular, produced by the inhabitant fish which can rapidly increase to lethal levels. Ammonia is best treated by its oxidation to nitrate which is non-toxic to fish in a process known as nitrification.

It is also well known that intimate contact between a reaction medium and a liquid can be readily achieved in fluidized bed apparatus, for example, as described in U. S. Pat. No. 5,250,187 adapted for water treatment by means of an ion exchange resin. In this apparatus, an incoming flow of untreated water is regulated by means of an external valve whilst a generally complicated arrangement is provided for the periodic replacement of the ion exchange resin.

Operation of fluidized bed apparatus requires that the flow of its fluidizing fluid, either gas or liquid, falls within desired limits so as to prevent its reaction medium, on the one hand, being entrained with treated fluid out of its fluidization chamber when the flow of the fluidizing fluid exceeds an upper limit and, on the other hand, from settling when the flow of the fluidizing fluid fails below a lower limit.

Furthermore, operation of fluidized bed apparatus preferably requires that it can be shut down, either inadvertently or intentionally, and restarted even though its reaction medium may have at least partially settled as a compact mass during the shutdown.

Still further, operation of fluidized bed apparatus preferably requires that there is no back suction of reaction medium during an inadvertent shut down which may cause clogging of the apparatus preventing its restart or even potential damage to the pump providing the flow of untreated fluid.

And finally, operation of fluidized bed apparatus preferably requires that its reaction medium can be readily replaced, for example, when its fluid treatment properties are exhausted.

SUMMARY OF THE INVENTION

It is the object of the present invention to provide a novel unitary fluid treatment apparatus which successfully addresses the hitherto mentioned operative requirements of fluidized bed apparatus and which is particularly adapted for aerobic biological filtration of water circulating in a fish holding tank.

In accordance with the present invention, there is provided fluid treatment apparatus operating with a reaction medium and comprising:

(a) a vessel having a fluid inlet port, a fluid outlet port and a deflector plate and containing the reaction medium; and (b) an inlet tube having an inlet end in flow communication with said fluid inlet port and a discharge end providing an incoming flow of untreated fluid against the deflector plate for reversal thereby to an outgoing flow of fluid passing through the reaction medium for treatment, the clearance between the discharge end and the deflector plate being selectively adjustable for controlling the flow of fluid through the vessel and maintaining the flow at a desired rate.

In a preferred embodiment of the present invention, the selective adjustment of the clearance between the discharge end and the deflector plate is performed by a manually rotatable flow regulator connected to the inlet tube such that rotation of the flow regulator adjusts the clearance between the discharge end and the deflector plate.

In a preferred embodiment of the present invention, the distance between the flow regulator and the deflector plate is constant, the consequence of which being that the flow regulator and the inlet tube are discretely formed parts coupled to one another such that the linear movement of the inlet tube relative to the deflector plate is imparted thereto by it being screw threaded on an interiorly disposed adjustment screw at its discharge end whilst its inlet end is rotatably driven by the flow regulator. In this arrangement, flow communication between the inlet end of the inlet tube and the fluid inlet port is maintained by the telescopic insertion of the inlet end in an interiorly disposed tube in flow communication with the fluid inlet port.

Whilst the fluid treatment apparatus is operative with a fixed filter, it is preferably operative with a fluidized bed filter for achieving a more efficient treatment of an untreated fluid. In particular, the fluid treatment apparatus can include nitrifying bacteria reaction medium for the biological filtration of water circulating in a fish holding tank.

BRIEF DESCRIPTION OF THE DRAWINGS

The invention is herein described, by way of example only, with reference to the accompanying drawings, wherein:

FIG. 2A is a cross sectional view of the fluid treatment apparatus of FIG. 1;

FIG. 2B is an end view of the inlet tube along line A—A in FIG. 2A;

FIG. 3 is an exploded view of the lid assembly of the fluid treatment apparatus of FIG. 1.

DETAILED DESCRIPTION OF THE DRAWINGS

Figure 1A:
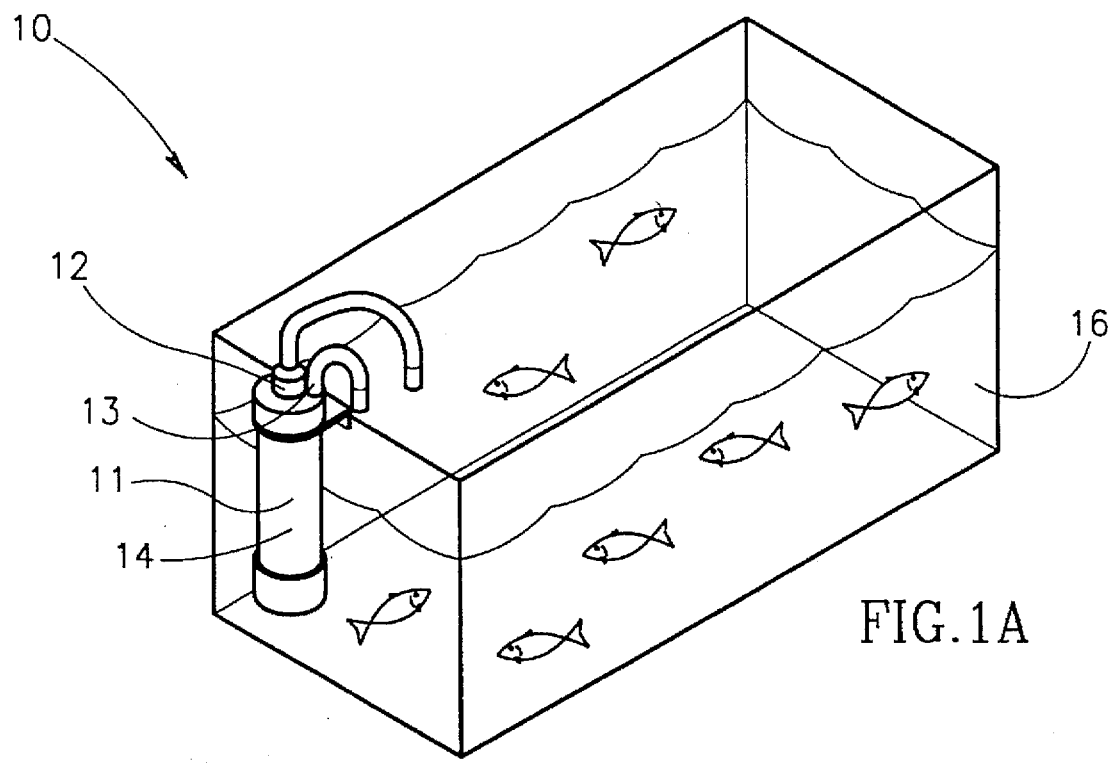
FIGS. 1A and 1B are schematic views of fluid treatment apparatus deployed for the biological filtration of water in a home aquarium.
Figure 1B:
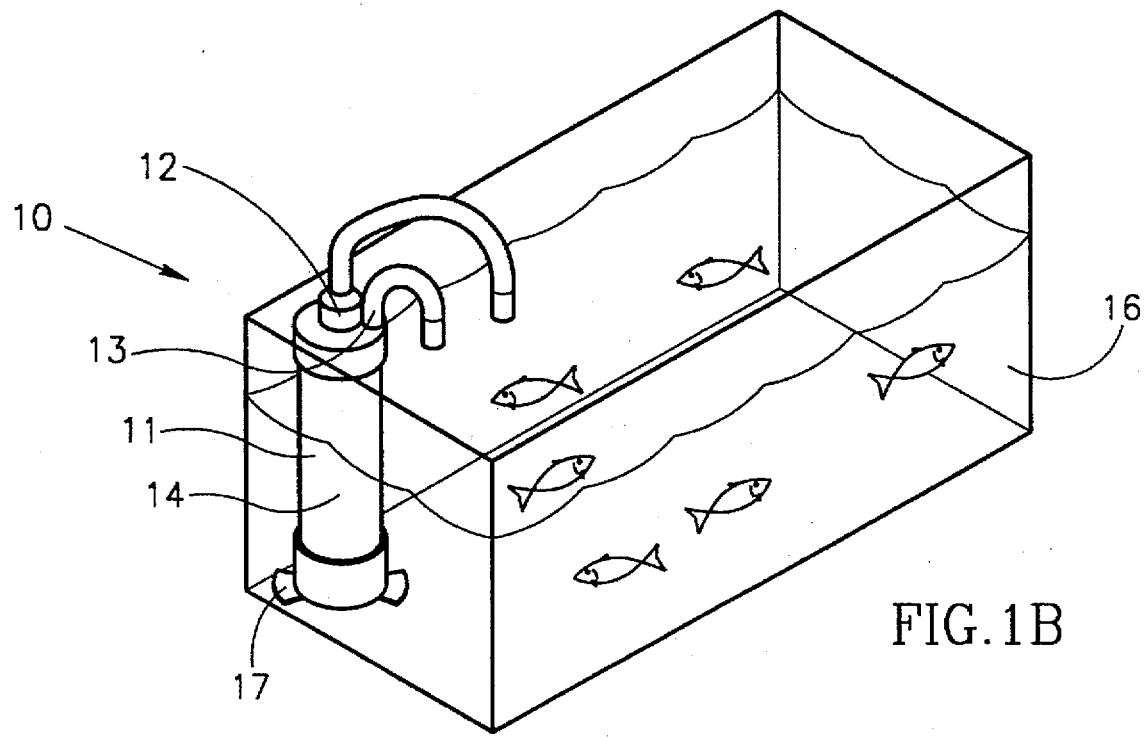

FIGS. 1A and 1B illustrate fluid treatment apparatus, generally designated 10, including a sealed vessel 11 having a fluid inlet port 12 and a fluid outlet port 13 and containing a fluidized bed filter 14 for the biological filtration of water circulated through a closed system constituted by the fluid treatment apparatus 10 and a home aquarium 16 by a pump (not shown). The fluidized bed filter 14 is in the form of suspended small porous media having a diameter in the range of about 0.1–0.2 mm which serve as a growth substrate for nitrifying bacteria of the genus Nitrosomonas for oxidizing ammonia to nitrite and of the genus Nitrobacter for oxidizing nitrite to nitrate which is non-toxic to fish. As shown, the fluid treatment apparatus 10 can be clamped to the side of the home aquarium 16 or free standing when fitted with detachable feet 17.

FIG. 2A shows that the sealed vessel 11 is constituted by a tubular fluidization chamber 18, preferably made of clear plastic, provided at its upper end 18A with an annular fitment 19 to which is bayonet fitted a removable lid assembly, generally designated 20, and at its lower end 18B with a deflector plate 22 to which the feet 17 can be attached. The deflector plate 22 is generally conically shaped having a centrally disposed flat portion 22A.

As also seen in FIG. 3, the lid assembly 20 includes an annular base member 23 which fits on the fitment 19 and which is formed with the fluid outlet port 13 and a centrally disposed conduit 24. A manually rotatable flow regulator 25 formed with a tube 26 is mounted on the base member 23 such that a lower end 26A of the tube 26 inwardly protrudes beyond a lower end 24A of the conduit 24 within the fluidization chamber 18. The fluid inlet port 12 is rotatably mounted with respect to an upper end 26B of the tube 26 by means of a tubular adaptor 28 such that the orientation of the fluid inlet port 12 is not disturbed by adjustment of the flow regulator 25.

Turning back to FIG. 2A, an inlet end 29A of an inlet tube 29 is telescopically inserted into the tube lower end 26A and is coupled thereto by means of an engagement bar 30 transversing a slot 32 prepared in the inlet end 29A. A discharge end 29B of the inlet tube 29 is disposed toward the deflector plate 22 for reversal of an incoming downward flow of untreated water from the home aquarium 16 so as to provide for an upwardly directed flow of water for fluidizing the fluidized bed filter 14.

The discharge end 29B is provided with a three spoke end piece 33 (see FIG. 2B) adapted for screw engagement on a centrally disposed adjustment screw 34 extending through the deflector plate 22 towards the interior of the fluidization chamber 18 such that rotation of the flow regulator 25 adjusts the clearance between the discharge end 29B and the deflector plate 22, thereby regulating the flow of water through the vessel 11 at a desired rate. As shown in FIG. 2A, the discharge end 29B is effectively sealed when it bears against the deflector plate's flat portion 22A, thereby preventing a flow of water through the vessel 11.

The spokes 33A of the end piece 33 are extended upwards so as to define a generally cup-shaped enclosure 35 in which a ball 36 is disposed, thereby constituting an one-way valve, generally designated 37, such that water and filter medium cannot be sucked back into the inlet tube 29 from the fluidization chamber 18 on interruption of operation of the home aquarium's pump. The shape of the cup-shaped enclosure 35 is such that its closed end snugly receives the ball 36 when it is urged thereagainst by the downward flow of untreated water so as to prevent any rattling of the ball 36.

Figure 4A:
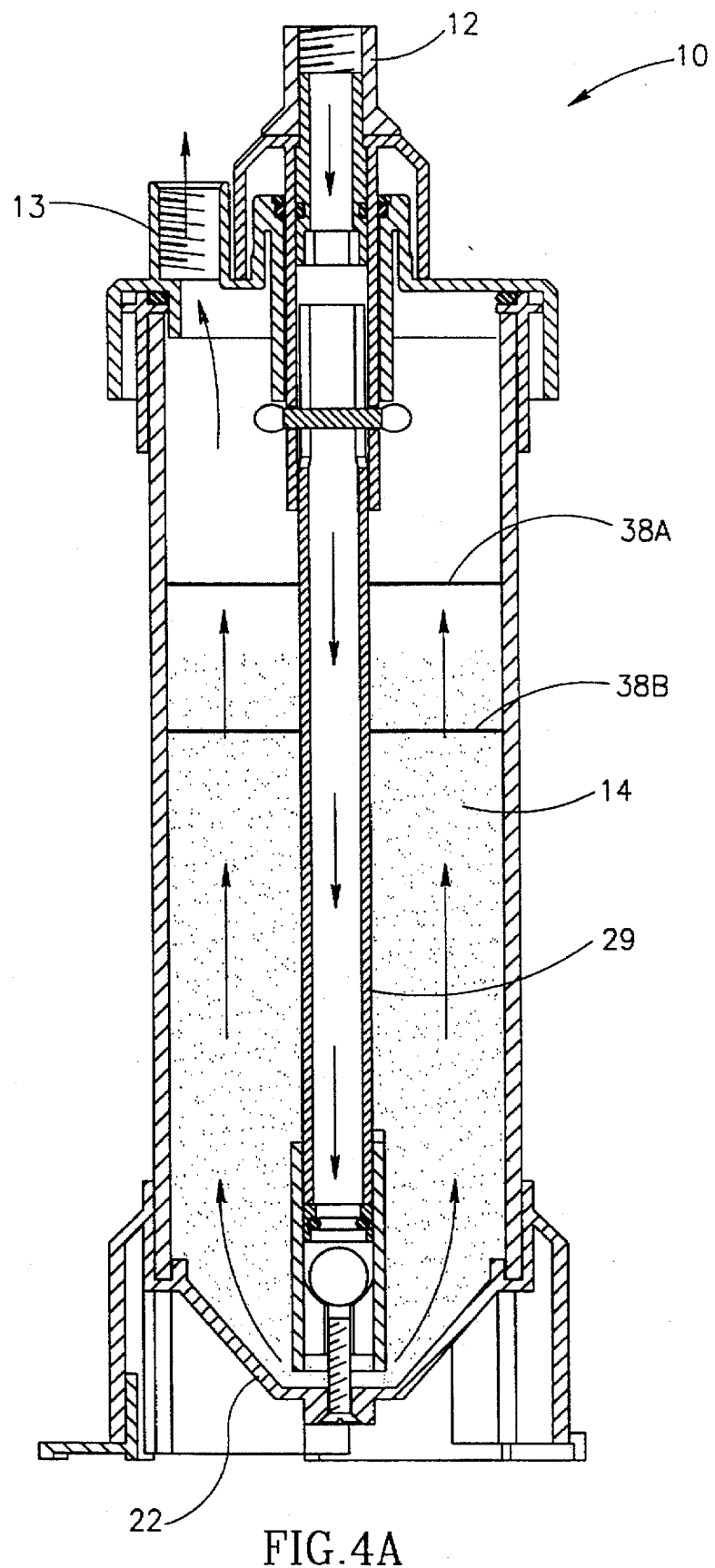
FIGS. 4A and 4B are views of the fluid treatment apparatus of FIG. 1 during operation and shutdown, respectively.

Operation of the fluid treatment apparatus 10 is now described with reference to FIGS. 4A and 4B. As shown in FIG. 4A, the fluid treatment apparatus 10 is set up on suitable adjustment of the flow regulator 25 such that the fluidization of the fluidized bed filter 14 is contained within predetermined upper and lower limits 38A and 38B indicated on the fluidization chamber 18. Typically, this is achieved by stopping down the discharge end 29B against the deflector plate's flat portion 22A and then slowly raising the same until the desired incoming rate of untreated water is obtained. As shown, the incoming flow is reversed by the deflector plate 22 so as to provide an upward outgoing flow of water which suspends the fluidized bed filter 14 and is filtered thereby as it passes therethrough before being returned to the home aquarium 16 via the fluid outlet port 13.

Figure 4B:
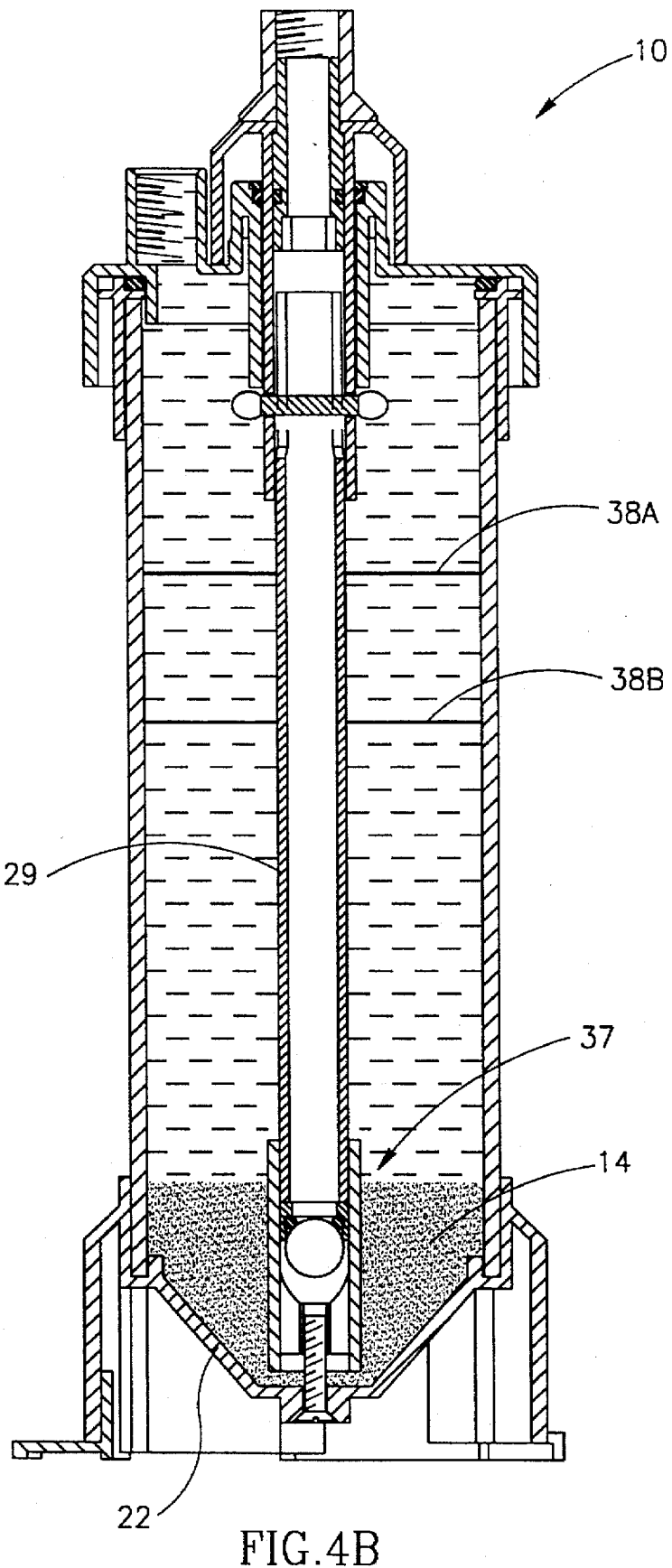

As shown in FIG. 4B, in the event of a shutdown of the home aquarium's pump, the back pressure in the inlet tube 29 causes the one way valve 37 to shut, thereby preventing water and filter medium 14 being sucked upwards thereinto and enabling the filter medium 14 to settle on the deflector plate 22. On the resumption of the incoming flow of untreated water, the filter medium 14 is re-suspended. If necessary, the discharge end 29B can be stopped downwards so as to increase the pressure of the incoming flow of water so as to break up a compact mass of filter medium if formed.

On a periodic basis, for example, when the nitrifying bacteria are contaminated, the porous media constituting the fluidized bed filter 14 can be readily replaced on removal of the lid assembly 20.

While the invention has been described with respect to a limited number of embodiments, it will be appreciated that many variations, modifications and other applications of the invention may be made.

We claim:

1. Fluid treatment apparatus operating with a reaction medium comprising:

(a) an elongated vessel having a first end and a second end and containing said reaction medium, said first end constituting a deflector plate, said vessel formed with a fluid inlet port and a fluid output port both disposed toward said second end; and (b) an inlet tube having an inlet end in flow communication with said fluid inlet port and a discharge end providing an incoming flow of untreated fluid in a first direction against said deflector plate for reversal of flow thereby to an outgoing flow of fluid in a second direction opposite to said first direction passing through said reaction medium for treatment, the clearance between said discharge end and said deflector plate being selectively adjustable for controlling the flow of fluid through said vessel and maintaining the flow at a desired rate, means for externally adjusting said clearance during the continuous operation of the apparatus.

2. Apparatus according to claim 1 further comprising a rotatable flow regulator connected to said inlet tube such that rotation of said flow regulator adjusts the clearance between said discharge end and said deflector plate.

3. Apparatus according to claim 2 wherein said inlet tube is displaceably coupled to said flow regulator which maintains a fixed distance from said deflector plate during said adjustment of said clearance.

4. Apparatus according to claim 3 wherein said flow regulator is disposed intermediate said fluid inlet port and said inlet tube.

5. Apparatus according to claim 4 wherein said fluid inlet port is rotatably mounted with respect to said flow regulator.

6. Apparatus according to claim 5 wherein said vessel includes a removable lid assembly including said fluid inlet port, said fluid outlet and said flow regulator.

7. Apparatus according to claim 6 wherein said inlet tube is downward depending for providing a flow of untreated fluid against said deflector plate for reversal thereby to an outgoing upward rising flow of fluid passing through a fluidized bed filter medium.

8. Apparatus according to claim 7 further comprising an one-way valve disposed at said discharge end for preventing back suction of said reaction medium into said inlet tube on interruption of said incoming flow of untreated fluid.

9. Fluid treatment apparatus operating with a fluidized bed filter medium for treatment of a liquid comprising:

(a) an upright elongated vessel having an upper end and a lower end and containing said filter medium, said lower end constituting a deflector plate, said vessel formed with a liquid inlet port and a liquid output port both disposed toward said upper end; and (b) an inlet tube having an inlet end in flow communication with said liquid inlet port and a discharge end providing a downward incoming flow of untreated liquid against said deflector plate for reversal of flow thereby to an upward outgoing flow of liquid passing through said filter medium for treatment, the clearance between said discharge end and said deflector plate being selectively adjustable for controlling the flow of liquid through said vessel and maintaining the flow of liquid at a desired rate, means for externally adjusting said clearance during the continuous operation of the apparatus.

10. Apparatus according to claim 9 further comprising a rotatable flow regulator connected to said inlet tube such that rotation of said flow regulator adjusts the clearance between said discharge end and said deflector plate.

11. Apparatus according to claim 10 wherein said inlet tube is displaceably coupled to said flow regulator which maintains a fixed distance from said deflector plate during said adjustment of said clearance.

12. Apparatus according to claim 11 wherein said flow regulator is disposed intermediate said liquid inlet port and said inlet tube.

13. Apparatus according to claim 12 wherein said liquid inlet port is rotatably mounted with respect to said flow regulator.

14. Apparatus according to claim 13 wherein said vessel includes a removable lid assembly including said fluid inlet port, said fluid outlet and said flow regulator.

15. Apparatus according to claim 14 further comprising an one-way valve disposed at said discharge end for preventing back suction of said medium into said inlet tube on interruption of said incoming flow of untreated liquid.

* * * * *